United States Patent
Jardin et al.

(10) Patent No.: US 7,673,026 B2
(45) Date of Patent: Mar. 2, 2010

(54) SPEED SENSITIVE CONTENT DELIVERY IN A CLIENT-SERVER NETWORK

(75) Inventors: Cary A. Jardin, San Diego, CA (US); Eric Varsanyi, Plymouth, MN (US); Phil J. Duclos, Longmont, CO (US); Vincent M. Padua, San Diego, CA (US); Robert C. Trescott, Jr., San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 10/840,067

(22) Filed: May 5, 2004

(65) Prior Publication Data

US 2004/0255019 A1    Dec. 16, 2004

Related U.S. Application Data

(63) Continuation of application No. 09/675,818, filed on Sep. 28, 2000, now Pat. No. 6,766,354.

(51) Int. Cl.
  *G06F 15/173* (2006.01)
(52) U.S. Cl. ............... 709/223; 709/217; 709/246
(58) Field of Classification Search ............... 709/217, 709/235, 218, 223, 250, 203, 246
  See application file for complete search history.

(56) References Cited

U.S. PATENT DOCUMENTS

| | | |
|---|---|---|
| 5,438,614 A | 8/1995 | Rozman et al. |
| 5,774,660 A | 6/1998 | Brendel et al. |
| 5,802,106 A | 9/1998 | Packer |
| 5,802,302 A | 9/1998 | Waclawsky et al. |
| 5,892,924 A | 4/1999 | Lyon et al. |
| 5,903,559 A | 5/1999 | Acharya et al. |
| 5,918,017 A | 6/1999 | Attanasio et al. |
| 5,920,705 A | 7/1999 | Lyon et al. |

(Continued)

FOREIGN PATENT DOCUMENTS

EP    0 817 444 A2    1/1998

(Continued)

OTHER PUBLICATIONS

Cardellini et al., "Dynamic Load Balancing in Web-Server Systems" *IEEE Internet Computing*, May, Jun. 1999, pp. 28-39.

(Continued)

*Primary Examiner*—Vivek Srivastava
*Assistant Examiner*—Adnan Mirza
(74) *Attorney, Agent, or Firm*—Fish & Richardson P.C.

(57) ABSTRACT

The response time from a client on a network is measured and a destination address is selected based on the measured response time. The client requests an address from the network. The network may be a local network or a wide area network such as the Internet. The response time of the client is measured to determine the optimum speed at which the client may operate. The measured response time is communicated to the server, where a destination address is selected based on the requested address and the measured response time. The client may then be connected to the destination address.

18 Claims, 3 Drawing Sheets

U.S. PATENT DOCUMENTS

| | | | |
|---|---|---|---|
| 5,931,904 A * | 8/1999 | Banga et al. | 709/217 |
| 5,933,596 A | 8/1999 | Mayhew | |
| 5,958,053 A | 9/1999 | Denker | |
| 5,978,849 A | 11/1999 | Khanna | |
| 6,078,956 A | 6/2000 | Bryant et al. | |
| 6,092,178 A | 7/2000 | Jindal et al. | |
| 6,098,108 A | 8/2000 | Sridhar et al. | |
| 6,304,913 B1 | 10/2001 | Rune | |
| 6,317,775 B1 | 11/2001 | Coile et al. | |
| 6,421,733 B1 * | 7/2002 | Tso et al. | 709/246 |
| 6,507,844 B1 | 1/2003 | Leymann et al. | |
| 6,542,468 B1 | 4/2003 | Hatakeyama | |
| 6,606,643 B1 | 8/2003 | Emens et al. | |
| 6,622,175 B1 | 9/2003 | Piller | |
| 7,139,844 B2 * | 11/2006 | Smith et al. | 709/250 |

FOREIGN PATENT DOCUMENTS

| | | |
|---|---|---|
| EP | 0 992 922 A2 | 4/2000 |

OTHER PUBLICATIONS

Bickmore, et al., "Digestor: device-independent access to the World Wide Web", *Computer Networks and ISDN Systems*, vol. 29, pp. 1075-1082, Sep. 1, 1997.

* cited by examiner

SPEED SENSITIVE CONTENT DELIVERY IN A CLIENT-SERVER NETWORK

CROSS-REFERENCE TO RELATED APPLICATIONS

This application is a continuation (and claims the benefit of priority under 35 USC 120) of U.S. application Ser. No. 09/675,818, filed Sep. 28, 2000, now U.S. Pat. No. 6,766,354. The disclosure of the prior application is considered part of (and is incorporated by reference in) the disclosure of this application.

TECHNICAL FIELD

This invention relates to measured data flow, and more particularly to connecting a client to a particular destination based on the connection speed of the client.

BACKGROUND

To provide greater access to the Internet, the communication protocols and languages utilized by the clients and servers have become standardized. These protocols include the Hyper-Text Transfer Protocol (HTTP), which is the communication protocol used for communications between clients and servers, and the Transfer Control Protocol/Internet Protocol (TCP/IP). The TCP portion is the transport-specific protocol for communication between computers or applications. IP is a lower-level protocol than TCP and facilitates the transmission of data packets between remotely-located machines. TCP is a transport-level protocol that operates on top of IP. TCP provides a full-duplex byte stream between applications, whether they reside on the same machine or on remotely-located machines. TCP ensures that transmitted data packets are received in the same order in which they were transmitted.

Remote terminals or computers may connect to the Internet via an Internet Service Provider (ISP) using a variety of connection methods and speeds. These may include, among other things, a dial-up modem at 28.8 kilobits per second (Kbps), dial-up at 56 Kpbs, an Integrated Services Digital Network (ISDN) line, a Digital Subscriber Line (DSL), a cable modem, or a T1 line. Although each of these methods allow for connection to the Internet, each method does so at differing speeds. For example, a typical dial-up modem connects to the Internet at 56 Kbps while a T1 line may connect at 1.544 million bits per seconds (Mbps). The increased bandwidth of the higher speed connections allows more information to be downloaded in a shorter period of time.

Web designers are taking advantage of the proliferation of high bandwidth connections to the Internet by creating more content rich websites. This allows more information, multimedia, and features to be provided to the users. However, for users that are connecting to the Internet using a slower speed connection, these high-content websites take an exceedingly long period of time to load. Many users allow a limited period of time for a website to download. If a website is not fully downloaded within this limited time period, the user typically logs off the Internet or proceeds to another website. Thus, web-designers are forced to decide between providing content rich sites for the high-bandwidth connections and losing the low-bandwidth connections or decreasing the amount of information provided to everyone.

DESCRIPTION OF DRAWINGS

These and other features and advantages of the invention will become more apparent upon reading the following detailed description and upon reference to the accompanying drawings.

DETAILED DESCRIPTION

Figure 1:
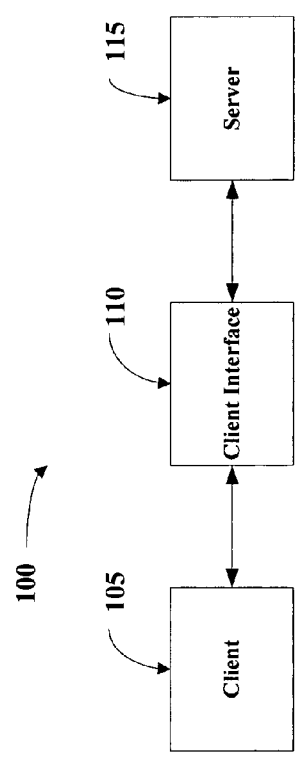
FIG. 1 is a block diagram of a network server connection using a client interface device according to an embodiment of the present invention.

FIG. 1 is a block diagram of a network server connection 100 using a client interface device 110 according to an embodiment of the present invention. A client 105 communicates with the client interface device 110. The client 105 may be a remote computer connected to a network such as a local area network, a wide area network, the Internet, or the like. For purposes of illustration, the invention will be described herein with a connection to the Internet. The client interface device 110 communicates with the server 115. The client interface device 110 relays information from the client 105 to the server 115 in both directions. The client interface device 110 may also directly connect the client 105 to the server 115.

Figure 2:
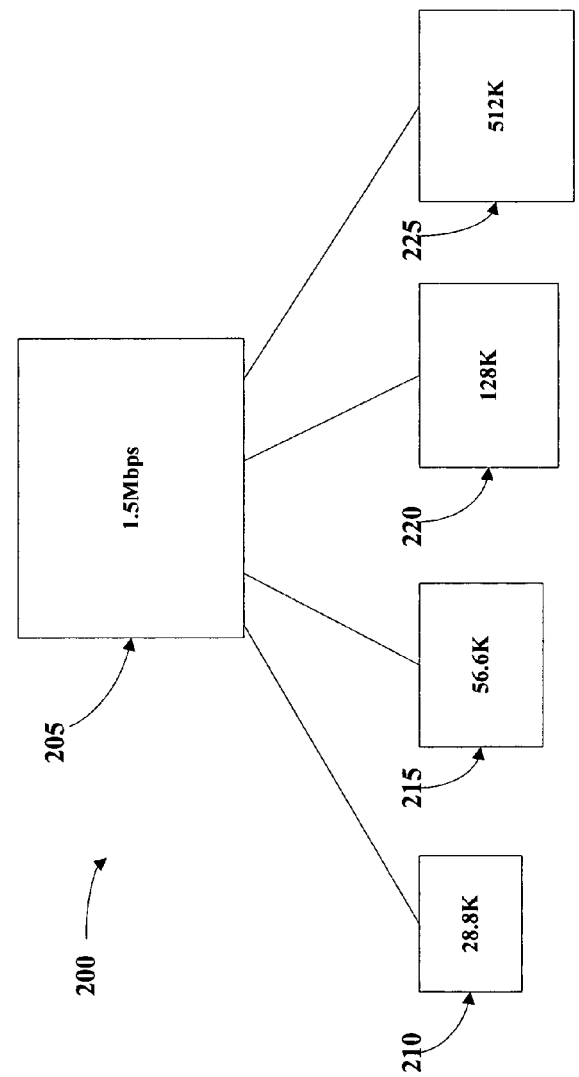
FIG. 2 illustrates a destination address including a plurality of sub-addresses optimized for specific connection speeds according to an embodiment of the present invention.

FIG. 2 illustrates a destination group 200 including a destination address 205 and a plurality of sub-addresses 210-225 optimized for specific connection speeds. Web designers are continually placing more and more information on a web page. This allows the web designers to increase the amount of information delivered to the client, and also allows for the creation of a more entertaining website using streaming video, music, and large graphic files. Those clients 105 connecting to the server 115 with a high bandwidth connection can enjoy the full features of the website.

The destination address 205 may be designed for optimal viewing by a client 105 connecting to the server 115 using a connection having 1.5 Mbps or higher. With this connection speed, the client 105 is able to view all of the content of the destination address 205 without undue delays caused by downloading. However, if a slower speed client 105 attempted to connect to the high bandwidth designed destination address 205, the client 105 would require a large amount of time to load the contents of the page. This would result in longer delays and a reduction in the quality of service provided the client 105. Therefore, web designers may create sub-addresses which are designed for slower speed connections. A first sub-address 210 may be designed for clients connecting at 28.8 Kbps, a second sub-address 215 may be designed for clients connecting at 56.6 Kbps, a third sub-address 220 may be designed for clients connecting at 128 Kbps, and a fourth sub-address 225 may be designed for clients connecting at 512 Kbps. Of course, the number of sub-addresses may vary site to site. Each of the sub-addresses 210-225 includes a reduced amount of content to allow the site to load within an acceptable period of time under the designated connection speed. To achieve this, the sub-addresses 210-225 may remove some multimedia content, use reduced resolution, delete some content, or other techniques to reduce the bandwidth necessary. If the destination address 205 is a graphics file, the sub-address 210-225 may be the same graphics file at respectively lower resolutions. The location of the sub-addresses 210-225 may be provided to a client 105 or client interface device 110 attempted to access the destination address 205.

Figure 3:
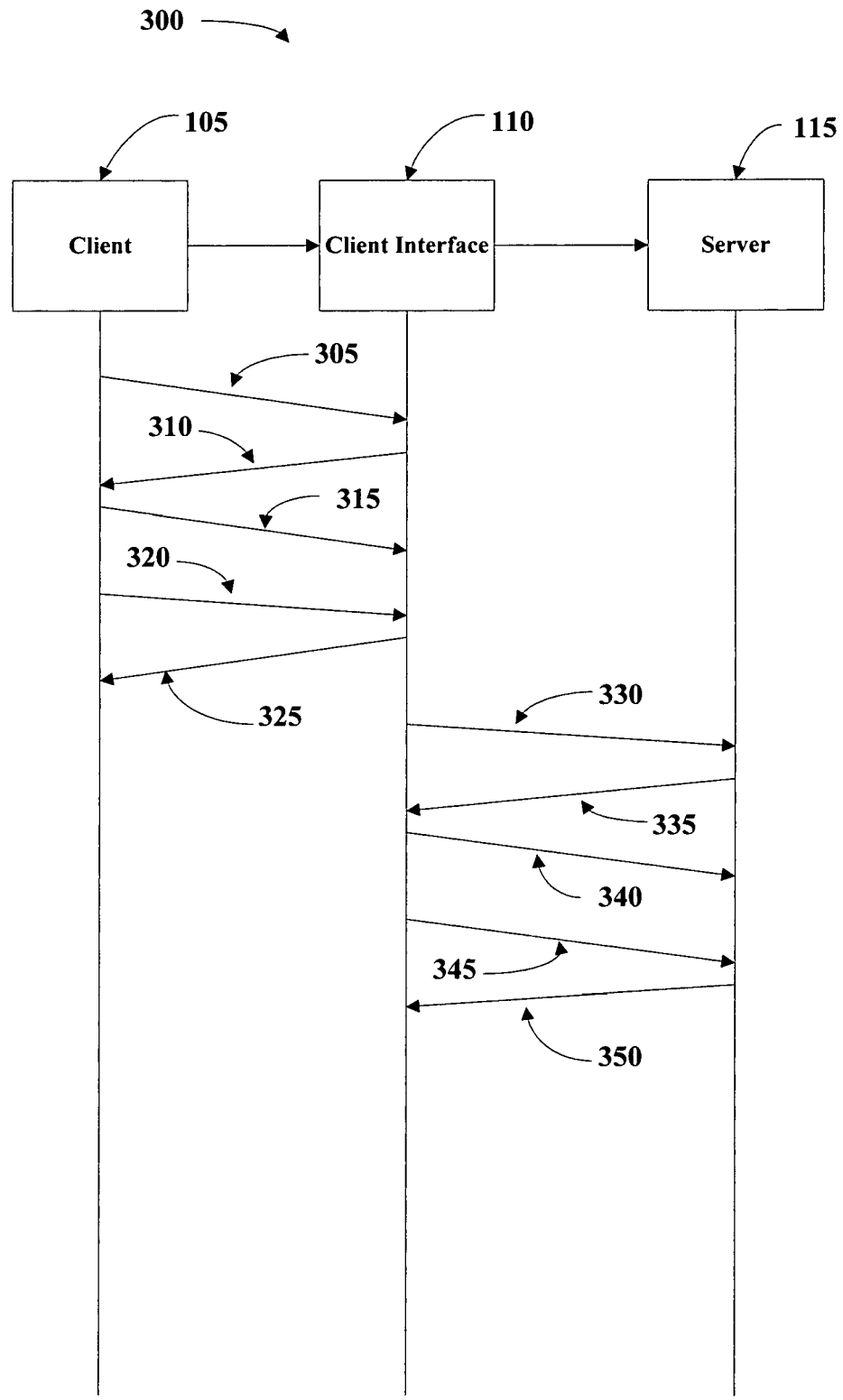
FIG. 3 is a diagram of the exchange between the client, the client interface device, and the server according to one embodiment of the present invention.

FIG. 3 is a diagram of the exchange between the client 105, the client interface device 110, and the server 115 according to one embodiment of the present invention. To initiate a connection to the server 115, the client 105 requests a connection by transmitting a SYN packet 305. Although the client 105 is sending the SYN packet to the server 115, the SYN packet will be received by the client interface device 110. The client interface device 110 then responds to the client 105 with a SYN/ACK packet 310. The client interface device begins timing upon transmission of the SYN/ACK packet 310. After receiving the SYN/ACK packet 310, the client 105 responds with an ACK 315 back to the client interface device 110. Once the ACK 315 is received, the client interface device 110 stops timing and calculates the elapsed time required for the communication to the client 105. Based on this elapsed time, the client interface device 110 is able to determine a profile for the client 105. The profile may include the data flow rate. Several factors may affect the profile of the client 105, including the connection speed and network congestion.

Once the client 105 has successfully established a connection, the client 105 may issue a GET request 320 to the server 115. The GET request 320 may be requesting a website, a file, or other destination. Once received, the client interface device 110 acknowledges the GET request 320 with an ACK 325 signal.

To complete the GET request 320, the client interface device 110 establishes a connection with the server 115. The client interface device 110 establishes the connection by transmitting a SYN packet 330 to the server 115. The server 115 receives the SYN packet 330 and responds with a SYN/ACK packet 335. After receiving the SYN/ACK packet 335, the client interface device 110 responds with an ACK 340 back to the server 115.

Now that the connection to the server 115 is established, the client interface device 110 examines the GET request 320 and determine if the client 105 can successfully complete this request in the necessary time frame. The client interface device 110 uses the client profile to determine the timing requirements. The client interface device 110 then creates a GET request based of the GET request 320 of the client 105 and the calculated client profile. If the client 105 is able to handle the original GET request 320, the client interface device 110 will simply forward that as the GET request 345 which is sent to the server 115. However, if the client 105 cannot handle the original GET request 320, the client interface device will determine a revised GET request 345 based on the client profile. For example, the original GET request may be for the destination address 205, but the client 105 may only have a 128 Kbps profile. In this circumstance, the client interface device 110 will rewrite the request to send the client to the sub-address 220. Thus, the GET request 345 sent to the server 115 will be for the sub-address 220. When the server 115 receives the GET request 345, the server 115 sends an ACK 350 to acknowledge the request.

After the server 115 receives the GET request 345, normal TCP/IP and HTTP protocols facilitate client request fulfillment. During this process, the client interface device 110 may create a more detailed profile of the client connection speed. Of course, the client interface device 110 may also directly connect the client 105 to the server 115.

Figure 4:
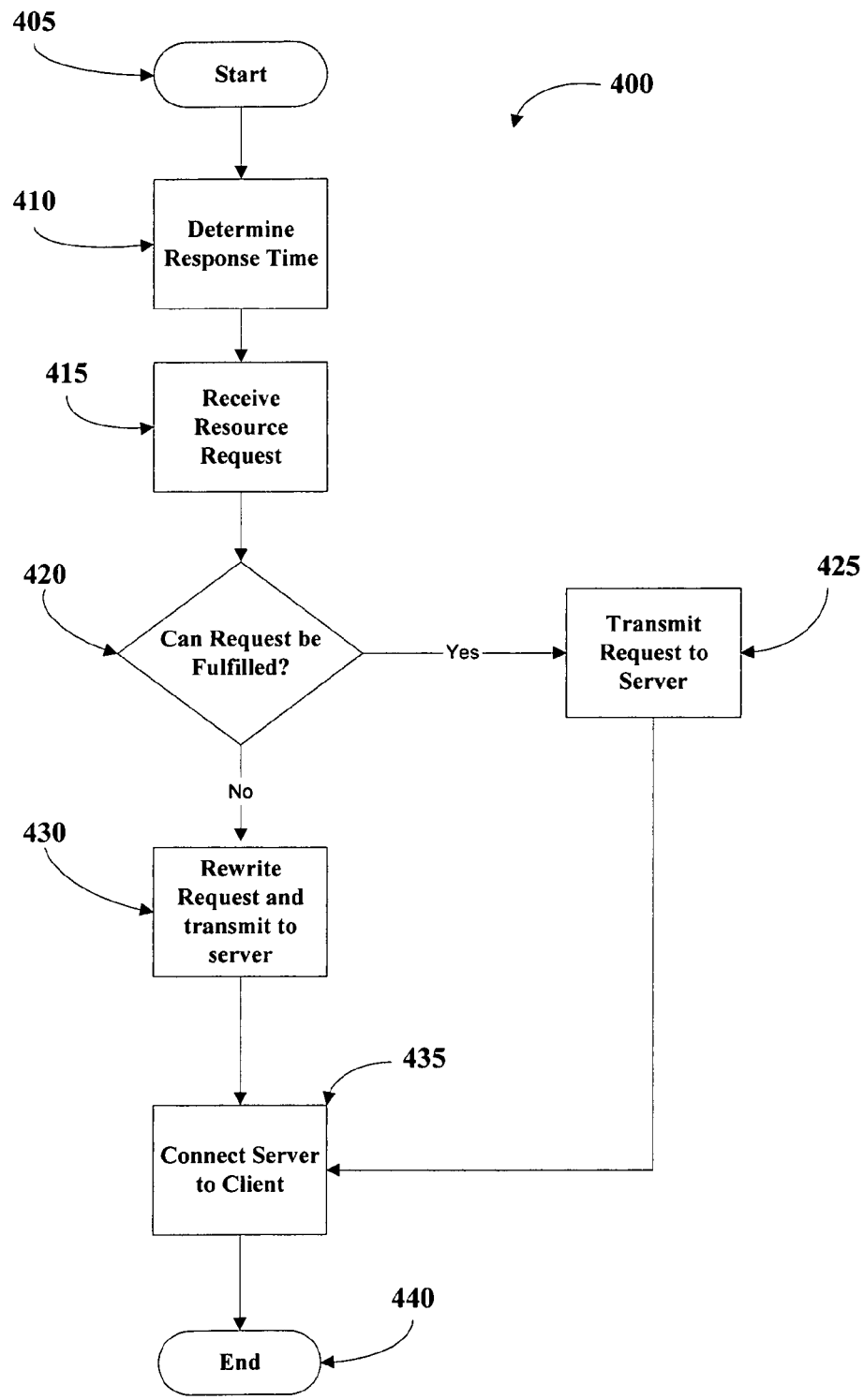
FIG. 4 is a flow chart of the process used by the client interface device to optimize the connection between the client and the server according to an embodiment of the present invention.

FIG. 4 is a flow chart of the process 400 used by the client interface device 110 to optimize the connection between the client 105 and the server 115 according to an embodiment of the present invention. The process 400 begins in START block 405. Proceeding to block 410, the client interface device 110 determines the response time of the client 105. This allows the client interface device 110 to estimate a connection speed of the client 105.

Proceeding to block 415, the client interface device 110 receives a resource request from the client 105. The resource request may be for a website, a file, or other data to be transferred to the client 105. The process 400 then proceeds to block 420. In block 420, the client interface device 110 determines if the resource request can be fulfilled based on the measured response time of the client 105. If the request can be fulfilled, the process 400 proceeds along the YES branch to block 425. In block 425, the resource request is transmitted to the server 115.

Returning to block 420, if the resource request cannot be fulfilled, the process 400 proceeds along the NO branch to block 430. In block 430, the client interface device rewrites the resource request to optimize the client loading based on the measured response time. For example, a client 105 may request a website "WEBSITE X" which is optimized for connection using 1.5 Mbps. However, the measured response time may indicate the client 105 has a connection time of 56 Kbps. In this case, the client interface device 110 may rewrite the request to "WEBSITE X56" which is the same website content optimized for 56 Kbps.

After the request or rewritten request is sent to the server 115, the process 400 proceeds to block 435. In block 435, the client interface device 110 connects the server 115 to the client 105. During the connection, the client interface device 110 may act as a conduit, continually measuring the client response time or may directly connect the server 115 to the client 105. The process 400 then terminates in END block 440.

Numerous variations and modifications of the invention will become readily apparent to those skilled in the art. Accordingly, the invention may be embodied in other specific forms without departing from its spirit or essential characteristics.

What is claimed is:

1. A method of enhancing data delivery comprising:

sending a first packet from a client interface to a remote terminal at a first time;

receiving at the client interface a second packet from the remote terminal at a second time;

determining a response time of the remote terminal at the client interface based on a time period between the first time and the second time;

using said response time to determine information related to a connection speed between the remote terminal and the client interface;

receiving a request, from the remote terminal, for a content version included in a plurality of different content versions, wherein each of the different content versions has a different amount of information and is optimized for a specific connection speed;

upon determining that the requested content version is too large in size for the remote terminal to provide based on said determined connection speed, automatically selecting a content version that is different from a requested content version, from said plurality of content versions; and providing the remote terminal with the selected content version.

2. The method of claim 1, further comprising determining a data flow rate from the determined response time of the remote terminal, and wherein the determining the response time comprises:
  starting a timer at the first time when the client interface sends the first packet to the remote terminal; and
  stopping the timer at the second time when the client interface receives the second acknowledgement packet from the remote terminal.

3. The method of claim 1, further comprising determining network congestion based on the determined response time.

4. The method of claim 1, further comprising determining the response time based on a timing of a handshake between the remote terminal and the client interface.

5. The method of claim 1, wherein the selected content version is smaller in size than a requested content version.

6. A method of connecting a remote terminal to a server comprising:
  determining a response time of a remote terminal at a client interface based on a time period elapsing between a first packet being sent from the client interface to the remote terminal and a second packet being received from the remote terminal at the client interface;
  using said response time to determine a connection speed between the remote terminal and the client interface;
  receiving a request from the remote terminal at the client interface for a content version;
  identifying a plurality of content versions at a server coupled to the client interface, each content version having a different amount of information at the server, each content version being optimized for a specific connection speed;
  determining, based on the connection speed between the remote terminal and the client interface, that the requested content version is too large in size for the remote terminal to provide;
  based on said connection speed, automatically selecting an alternative content version of the plurality of content versions, the alternative content version smaller in size than the requested content version; and
  providing the selected alternative content version to the remote terminal in response to the request.

7. The method of claim 6, further comprising determining a data flow rate from the remote terminal based on the response time.

8. The method of claim 6, further comprising determining a network congestion based on the determined response time.

9. An apparatus, including instructions residing on a machine-readable storage medium, for use in a machine-based system to handle a plurality of instructions, the instructions causing the machine system to:
  send a first packet from a client interface to the remote terminal;
  receive at the client interface a second packet from the remote terminal;
  determine a response time of the remote terminal at the client interface based on a time period between the first packet being sent and the second packet being received;
  use said response time to determine a connection speed between the remote terminal and the client interface;
  receive a request for a content version from the remote terminal at the client interface;
  determine, based on the determined connection speed, that the requested content version is too large in size for the remote terminal to provide;
  access a plurality of content versions located at a server, each content version having a different amount of content, and each content version being optimized for a specific connection speed;
  automatically select an alternative content version of the plurality of content versions that the remote terminal can provide, based on the determined connection speed; and
  communicate the selected version from the server to the remote terminal.

10. The apparatus of claim 9, wherein the instructions further cause the machine system to connect the remote terminal to the server.

11. The apparatus of claim 9, wherein the response time includes effects for network congestion.

12. The apparatus of claim 9, wherein the response time is determined based on the timing of a handshake between the remote terminal and the client interface.

13. The method of claim 6, wherein determining the response time further comprises:
  sending the first packet from the client interface to the remote terminal; and
  receiving the second packet at the client interface from the remote terminal.

14. An apparatus, including instructions residing on a machine-readable storage medium, for use in a machine-based system to handle a plurality of instructions, the instructions causing the machine system to perform operations comprising:
  sending a first packet from a client interface to a remote terminal at a first time;
  receiving at the client interface a second packet from the remote terminal at a second time;
  determining a response time of the remote terminal at the client interface based on a time period between the first time and the second time;
  using said response time to determine information related to a connection speed between the remote terminal and the client interface;
  receiving a request, from the remote terminal, for a content version included in a plurality of different content versions, wherein each of the different content versions has a different amount of information and is optimized for a specific connection speed;
  upon determining that the requested content version is too large in size for the remote terminal to provide based on said determined connection speed, automatically selecting a content version, that is different from a requested content version, from said plurality of content versions; and
  providing the remote terminal with the selected content version.

15. The apparatus of claim 14, the operations further comprising determining a data flow rate from the determined response time of the remote terminal, and wherein determining the response time comprises:
  starting a timer at the first time when the client interface sends the first packet to the remote terminal; and
  stopping the timer at the second time when the client interface receives the second acknowledgement packet from the remote terminal.

16. The apparatus of claim 14, the operations further comprising determining network congestion based on the determined response time.

17. The apparatus of claim 14, the operations further comprising determining the response time based on a timing of a handshake between the remote terminal and the client interface.

18. The apparatus of claim 14, wherein the selected content version is smaller in size than the requested content version.

* * * * *